United States Patent [19]

Moriya et al.

[11] 4,237,257
[45] Dec. 2, 1980

[54] PROCESS FOR PRODUCING LOW MOLECULAR WEIGHT STYRENE SERIES POLYMERS

[75] Inventors: Yasuo Moriya; Takeshi Komai, both of Aichi, Japan

[73] Assignee: Nippon Oil and Fats Co., Tokyo, Japan

[21] Appl. No.: 922,753

[22] Filed: Jul. 7, 1978

[30] Foreign Application Priority Data

Jul. 9, 1977 [JP] Japan ................................. 52-82389
Sep. 2, 1977 [JP] Japan ................................ 52-104720

[51] Int. Cl.³ ............................................. C08F 12/08
[52] U.S. Cl. ................................. 526/230.5; 526/227; 526/293; 526/321; 526/329.2; 526/331; 526/340; 526/342; 526/346; 526/347
[58] Field of Search .................. 526/227, 230.5, 346, 526/347, 89, 199, 200, 202, 203, 234, 293, 321, 331, 340, 342

[56] References Cited

U.S. PATENT DOCUMENTS

| | | | |
|---|---|---|---|
| 2,464,062 | 3/1949 | Strain | 526/346 |
| 3,108,093 | 10/1963 | Pajaczkowski | 526/346 |
| 3,129,206 | 4/1964 | Pajaczkowski | 526/227 |

FOREIGN PATENT DOCUMENTS 34-10046 of 1959 Japan .
49-2340 1/1974 Japan .
49-2341 1/1974 Japan .

OTHER PUBLICATIONS

Encyclopedia of Polymer Sci. and Technology 13, p. 167 (1970).
Encyclopedia of Polymer Sci. and Technology 2, p. 645 (1965).

*Primary Examiner*—Harry Wong, Jr.
*Attorney, Agent, or Firm*—Blanchard, Flynn, Thiel, Boutell & Tanis

[57] ABSTRACT

Styrene-type monomers are polymerized, or mixtures of styrene-type monomers and other vinyl type monomers and copolymerized, at 50°–120° C. using 1–10 wt%, based on the weight of the monomers, of an organic peroxide polymerization initiator whose decomposition temperature at 10 hours of halflife is 40° C. to 70° C. whereby colorless low molecular weight styrene series polymers are obtained at a high yield, using polymerization apparatus of simple structure.

11 Claims, No Drawings

PROCESS FOR PRODUCING LOW MOLECULAR WEIGHT STYRENE SERIES POLYMERS

BACKGROUND OF THE INVENTION

1. Field of the Invention

This invention relates to a novel process for producing low molecular weight styrene polymers or low molecular weight copolymers of styrene and another vinyl type monomer.

2. Description of the Prior Art

Heretofore, there have been proposed mainly the following methods for producing low molecular weight styrene polymer having a number average molecular weight of less then 5000.

(1) Radical telomerization
(2) Ion telomerization
(3) Thermal polymerization

The method (1) and the method (2) carry out the polymerization in the presence of a large quantity of chain transfer agents such as halogen compounds, mercaptan compounds and the like and the method (3) is a solution polymerization method in which the polymerization is carried out in the presence of a large quantity of solvent which easily undergoes chain transfer, such as cumene, benzyl alcohol derivatives and the like.

The method (1) and method (2) introduce fragments of the chain transfer agents, namely halogen, mercaptan and the like, into the end parts of the obtained polymer chain with the result being that the thermal stability thereof is decreased and they are possibly decomposed which is not preferred because of environmental pollution.

Both methods require recovery of the solvent because a large quantity of the solvent is used and they also require the use of a sealed apparatus because many chain transfer agents used in the methods generally have bad odours and are poisonous and, further, a process for separating the chain transfer agents from the resultant product is required. Accordingly, both methods have disadvantages in that complicated procedures are needed.

Further, the method (2) has troubles in that according to the method (2), it is difficult to eliminate the catalysts remaining in the obtained polymers and the catalysts used in the method (2) are in general unstable in water.

Because the method (3) also looses much energy during the procedures and a large and strong polymerization apparatus is required, it is unpreferable for producing low molecular weight styrene polymers.

Another method involving increasing the quantity of the polymerization initiator has been contemplated.

However, it is difficult by that method to obtain polymers having a definite value of number average molecular weight, because the polymerization temperature therefor is difficult to control. Further it was found that even if the quantity of the polymerization initiator was increased, the effect on lowering the number average molecular weight of the polymers was small. (refer to Japanese Patent Publication No. SH049—2340)

Concerning polystyrenes in general, they are defined as polymers having number average molecular weights in the order of several millions and they are used mainly as molding materials. Low molecular weight polystyrenes generally have number average molecular weight of from several hundreds to several tens of thousands and they are used in many fields.

The low molecular weight styrene series polymers are useful, for example, as base materials for toners of electrophotography and for hot melt type coating materials, pigment dispersants, and tackifiers.

Also the low molecular weight styrene series polymers possess high reactivities so that they can be transformed into many kinds of derivatives. For example they are used for synthesizing a low molecular weight polystyrenic acid by sulfonation of the phenyl groups thereof and also they are used for introducing quaternary ammonium groups into the phenyl groups by chloromethylation and quaternary ammoniazation.

Further they are useful as intermediates.

SUMMARY OF THE INVENTION

An object of this invention is to provide a novel process for producing low molecular weight styrene system polymers which does not require a large quantity of chain transfer agent or does not use a solvent which is liable to undergo chain transfer, so that it is not necessary to recover the solvent and the process is simple.

Another object of this invention is to provide a process for producing low molecular weight styrene series polymers, wherein fragments of the chain transter agents used, such as halogen, mercaptan and the like do not enter the end parts of the molecular chain so that the polymers possess excellent thermal stability.

A further object of this invention is to provide a process for producing low molecular weight styrene series polymers which can be polymerized, at a low temperature, in the ambient atmosphere, using a polymerization apparatus of simple structure.

A further object of this invention is to provide a process for producing low molecular weight styrene series polymers in which the polymerization temperature is controlled easily and the polymerization time is short and the obtained polymers are substantially colorless.

A further object of this invention is to provide a process for producing low molecular weight styrene series polymers having a desired molecular weight which can be obtained by adjusting the kind and amount of the organic peroxide polymerization initiator used and the polymerization temperature.

Also a further object of this invention is to provide a process for producing low molecular weight styrene series polymers in which when the polymerization conversion ratio thereof is more than 90%, the viscosity of the obtained product does not increase, therefore a yield of more than 90% can be obtained using a polymerization apparatus of simple structure. A further object of this invention is to provide a process for producing low molecular weight styrene series polymers in which the polymers obtained by suspension polymerization are in the pearl state and may be collected by filtration easily.

According to this invention, into styrene-series monomer or a mixture of styrene-series monomer and vinyl type monomers copolymerizable with styrene, there is added an organic peroxide polymerization initiator of which the decomposition temperature at ten hours of half life is from 40° C. to 70° C., in an amount of 1 wt% to 10 wt%, based on the weight of the styrene or the total weight of the styrene and vinyl type monomers copolymerizable with styrene, and the thus resulting mixture is subjected to polymerization at a temperature of 50° C. to 120° C., whereby lower molecular weight styrene series polymers can be obtained with high yield.

The polymerization may be carried out by suspension polymerization in water and bulk polymerization.

As for vinyl type monomers copolymerizable with styrene, there are mentioned for example styrene homologues such as α-methylstyrene, vinyltoluene, bromostyrene and the like, unsaturated monocarboxylic acid esters such as methyl methacrylate, butyl methacrylate, methyl acrylate and the like, unsaturated dicarboxylic acid esters such as dimethyl itaconate, dimethyl maleate, vinyl esters such as acrylonitrile, vinylacetate and the like, butadiene, butene and the like.

The charging ratio of vinyl type monomers to styrene is preferably less than 50 mole %.

When it is more than 50 mole %, the polymerization conversion ratio is decreased.

In this invention, there are used organic peroxide polymerization initiators, whose decomposition temperatures at ten hours of half life are 40°–70° C. For example there are mentioned the organic peroxide polymerization initiators shown in Table 1.

Table 1

| | Compounds | Decomposition temperature at ten hours of half life (0.1 mole/l in benzene) |
|---|---|---|
| Peroxydicarbonates | Diisopropyl peroxydicarbonate | 40.5° C. |
| | Di-n-propyl peroxydicarbonate | 40.5° C. |
| | Di (2-ethoxyethyl) peroxydicarbonate | 43.5° C. |
| Peroxyesters | tert-Butyl peroxydodecanoate | 48° C. |
| | tert-Butyl peroxypivalate | 55° C. |
| Peroxydiacyls | Di (3,5,5-trimethyl hexanoyl) peroxide | 59.5° C. |
| | Dilauroyl peroxide | 62° C. |
| | Dipropionyl peroxide | 64° C. |
| | Diacetyl peroxide | 69° C. |

When an organic peroxide polymerization initiator whose decomposition temperature at ten hours of half life is less than 40° C. for example, diisobutyryl peroxide (its decomposition temperature at ten hours of half life is 32.5° C.), is used, low molecular weight polymers may be obtained but it is not preferable to carry out the polymerization under the said conditions, because the polymerization conversion ratio thereof is not increased.

On the other hand, when there is used an organic peroxide polymerization initiator whose decomposition temperature at ten hours of half life is more than 70° C., at the polymerization temperature in the range as defined in this invention, the effect on lowering the molecular weight of the resulted polymer is poor and also the generation of heat in the polymerization reaction is not uniform.

The amount used of the organic peroxide polymerization initiator depends on the molecular weight of the desired low molecular weight styrene series polymers and it is 1–10 wt%, based on the weight of the styrene or the total weight of the styrene and the vinyl type monomers copolymerizable with styrene, preferably 3–8 wt%.

When the amount used of the organic peroxide polymerization initiator is less than 1 wt%, the polymerization conversion ratio is lowered and the obtained polymers are not in pearl state in the case of suspension polymerization.

Also, when the amount used of the organic peroxide polymerization initiator is more than 10 wt%, the efficiency of polymerization initiation of the peroxide is lowered and then it is not economical to carry out the polymerization under such conditions.

The polymerization temperature is from 50° C. to 120° C., preferably 60° C. to 90° C.

When the polymerization temperature is less than 50° C., the polymerization velocity is slow and accelerated polymerization accompanied by rapid generation of heat occurs and thus it is hard to control the polymerization. When the polymerization temperature is more than 120° C., thermal polymerization occurs, whereby control of the polymerization becomes difficult and the efficiency of the organic peroxide polymerization initiator is lowered.

In this method, it is more preferable to carry out the polymerization at a temperature of higher than the decomposition temperature at ten hours of half life of the polymerization initiator by 20°–30° C. Accordingly the low molecular weight styrene series polymers having a number average molecular weight of less than 5000 can be obtained easily.

Also according to this method, the reaction can be restrained by the polymerization initiator.

Also as the polymerization initiator used in this method has a decomposition temperature at ten hours of half life of from 40° to 70° C., the polymerization temperature is decreased below 100° C., whereby the reaction can be restrained.

Regarding the dispersants used in the water phase of suspension polymerization, there are mentioned organic dispersants such as polyvinyl alcohol, polyacrylate, gelatin, methylcellulose and the like, and inorganic fine grains of such substances as calcium carbonate, barium sulfate and the like. The concentration of the dispersant is varied with the kind of the dispersant employed and the mixing ratio of monomers to water in the polymerization, but the dispersants are used in amounts of 0.01–0.5 wt%, preferably 0.04–0.2 wt% based on the weight of the water.

The mixing ratio of the water to the starting monomers is 1.0–5.0 times, preferably 1.0–2.0 times the weight of the water.

Further, the pearls of the obtained polymers may be varied with the stirring velocity, the concentration of the dispersant and the mixing ratio of the monomers to the water.

When suspension polymerization is carried out in water according to the present invention, the polymerization may be run by a process comprising adding monomers and polymerization initiators into an aqueous solution of dispersants obtained by dissolving or dispersing the same into water, and heating the resulting mixture to the predetermined temperature with stirring to keep the monomers in suspension or a process comprising heating an aqueous solution of dispersants to the predetermined temperature while being stirred and dropping a solution obtained by dissolving the polymerization initiators into the monomers.

When bulk polymerization is carried out according to the present invention, the polymerization may be carried out by heating a mixture of monomers and the organic peroxide polymerization initiators to the predetermined temperature while being stirred or by dropping the organic peroxide polymerization initiators or the same dissolved in one part of monomers to be polymerized into monomers which are being heated to the predetermined temperature, with stirring.

The number average molecular weight of the obtained polymers may be controlled by the kind and quantity of the organic peroxide polymerization initiator used and the polymerization temperature. That is to say, the lower the half life temperature of the organic peroxide polymerixation initiator used, the higher is the quantity thereof and the higher is the polymerization temperature, the lower is the number average molecular weight of the obtained polymer.

PREFERRED EMBODIMENTS OF THE INVENTION

Percentages used in all examples is weight %.

EXAMPLE 1.

(suspension polymerization)

Into a 500 ml four neck flask which was equipped with a reflux condenser, a mechanical stirrer, a thermometer and a dropping funnel, 200 g of 0.04% aqueous solution of polyvinyl alcohol was added and elevated to a temperature of 70° C. with introducing nitrogen gas therein while being stirred. Next, a mixture in which 5 g of diisopropyl peroxydicarbonate was dissolved into 95 g of styrene was dropped into the flask from the dropping funnel for about 5 minutes. The temperature of the content of the flask fell by 5° C. after the dropping operations were over. The contents in the flask were stirred for 3 hours with the temperature kept at 70° C. Further the obtained pearls of styrene polymers were filtered three times filtered and washed with water and were dried in vacuum until the weight thereof reached a constant value. The yield was 97% and the number average molecular weight thereof was 1950. (molecular weight of polymers was measured by the method applying steam osmotic pressure to samples by Hitachi Perkin Elmer type 115 made by Hitachi Manufacturing Co., Ltd. Measurements of molecular weight of polymers described in the following were done by the same procedure as described in Example 1.)

EXAMPLE 2-4.

(suspension polymerization)

Styrene monomers were polymerized according to the same procedure as that described in Example 1 using 5% of diisopropyl peroxycarbonate based on the weight of the styrene monomers with changing the amount used of 0.04% aqueous solution of polyvinyl alcohol and the polymerization temperature as shown in Table 2. The reaction conditions and obtained results are shown in Table 2.

Table 2

| Example No. | Polymerization temperature | Amounts of aqueous solution of polyvinyl alcohol | Weight of styrene monomers | Number average molecular weight of styrene polymers | Yield of styrene polymers |
|---|---|---|---|---|---|
| 2 | 75° C. | 200g | 95g | 1800 | 98% |
| 3 | 70° C. | 200g | 95g | 1950 | 97% |
| 4 | 70° C. | 150g | 95g | 2000 | 99% |

EXAMPLE 5-7

(suspension polymerization)

Styrene and another vinyl type monomer were copolymerized using a diisopropyl peroxydicarbonate as an organic peroxide polymerization initiator according to the same procedures as that described in Example 1. The polymerization conditions and the obtained results are shown in Table 3. (the polymerization hour was 3 hours)

EXAMPLE 8-10 (suspension polymerization)

The same procedure as that described in Example 1 was carried out with varying the kinds and quantities of the organic peroxide polymerization initiators and the polymerization temperature shown in Table 4.

The polymerization conditions and obtained results are shown in Table 4.

Table 3

| Example No. | Mixing ratio of another vinyl type monomers to styrene (%) | | Concentration of organic peroxide polymerization initiator (%) | Polymerization temperature (°C.) | Number average molecular weight of styrene polymer | Yield of styrene copolymer (%) |
|---|---|---|---|---|---|---|
| 5 | Methyl methacrylate | 10 | 5 | 70 | 2500 | 95 |
|   | Styrene | 90 |   |   |   |   |
| 6 | α-methyl-styrene | 10 | 8 | 70 | 1450 | 93 |
|   | Styrene | 90 |   |   |   |   |
| 7 | Methyl acrylate | 10 | 5 | 70 | 2300 | 98 |
|   | Styrene | 90 |   |   |   |   |

Table 4

| Example No. | Organic peroxide polymerization initiator | | Polymerization temperature (°C.) | Number average molecular weight of styrene polymer | Yield of styrene polymer (%) |
|---|---|---|---|---|---|
|   | Name | Concentration (%) |   |   |   |
| 8 | Dilauroyl peroxide | 8.0 | 85 | 2150 | 95 |
| 9 | tert - Butyl peroxypivalate | 5.0 | 85 | 2300 | 98 |

Table 4-continued

| Example No. | Organic peroxide polymerization initiator | | Polymerization temperature (°C.) | Number average molecular weight of styrene polymer | Yield of styrene polymer (%) |
| --- | --- | --- | --- | --- | --- |
| | Name | Concentration (%) | | | |
| 10 | Di-n-propyl peroxydicarbonate | 5.0 | 70 | 2000 | 95 |

EXAMPLE 11.

(Bulk polymerization)

Into a 300 ml four neck flask which was equipped with a reflux condenser, a mechanical stirrer, a thermometer and a dropping funnel, 50 g of styrene monomer was charged with introducing nitrogen gas and was heated to a temperature of 75° C. while being stirred.

Next, a mixture of 50 g of styrene monomer and 4 g of diisopropyl peroxydicarbonate were dropped into the flask from the dropping funnel and the contents of the flask were stirred for 2 hours. Further the resultant reaction mixture was poured into methanol and the thus obtained precipitates were filtered off and were dried in vacuum until the weight thereof reached a constant value. In the above procedure, the polymerization temperature was kept at 74°–76° C. and the control of the polymerization temperature was easy.

The yield of the polystyrene was 75% and the number average molecular weight of the polystyrene was 2600.

EXAMPLE 12-15.

(Bulk polymerization)

The same procedures as that described in Example 11 was carried out except that the concentration of the organic polymerization initiator and the polymerization temperature were changed to the respective ones as shown in Table 5.

The obtained results are shown in Table 5.

Table 5

| Example No. | Polymerization Temperature °C. | Concentration of organic peroxide polymerization initiator % based on monomer | Yield % | Average molecular weight of styrene polymer |
| --- | --- | --- | --- | --- |
| 12 | 75 ± 1 | 5.0 | 95 | 1900 |
| 13 | 75 ± 1 | 3.0 | 67 | 2900 |
| 14 | 85 ± 1 | 4.0 | 64 | 1800 |
| 15 | 85 ± 1 | 3.0 | 60 | 2800 |

EXAMPLE 16.

(Bulk polymerization)

10 g of a mixture of styrene monomer and 3.5% of t-butyl peroxypivalate as an organic peroxide polymerization initiator based on the weight of the styrene monomer was introduced into an ampule for polymerization.

The atmospheres in the ampule were substituted with nitrogen gas and the ampule was sealed by welding in vacuum.

The contents of the flask was subjected to polymerization for 2 hours in a thermostat maintained at 90° C.

Later the resulting reaction mixture was cooled thereby to stop the polymerization reaction and then was poured into methanol whereby the styrene polymers were allowed to preciitate.

The precipitated styrene polymers were separated by filtration and were dried in vacuum until the weight thereof reached a constant value. The yield was 68% and the average molecular weight of the obtained polymer was 2500.

EXAMPLE 17-19 AND COMPARATIVE EXAMPLE 1

(Bulk polymerization)

The same procedures as that described in Example 11 was carried out with varying the kind of the organic peroxide polymerization initiators, the concentration of the polymerization initiator and the polymerization initiator as shown in Table 6. The obtained results are shown in Table 6.

Table 6

| Example No. | Organic peroxide polymerization initiator | | Polymerization temperature (°C.) | Yield (%) | Number average molecular weight of styrene polymer |
| --- | --- | --- | --- | --- | --- |
| | Name | Concentration of polymerization initiator % based on monomers | | | |
| 17 | Dilauroyl peroxide | 6.5 | 90 | 62 | 2300 |
| 18 | Di-n-propyl peroxydicarbonate | 3.5 | 70 | 65 | 2500 |
| 19 | Di-(2-ethoxyethyl) peroxydicarbonate | 3.5 | 70 | 50 | 4700 |
| comparative example 1 | Diisobutyryl peroxide | 3.5 | 50 | 21 | 4600 |

EXAMPLE 20-22

(Bulk polymerization)

Styrene and an other vinyl type monomers were copolymerized according to the same procedures as that described in Example 11 except that the di-n-propyl peroxydicarbonate was used as the organic peroxide polymerization initiator, the concentration of said polymerization initiator being 3.5% based on the total weight of the styrene and an other vinyl type monomers and the polymerization time was 2 hours.

The obtained results are shown in Table 7.

Table 7

| Example No. | Mixing ratio of styrene to another vinyl type monomers | | Polymerization temperature °C. | Yield % | Number average molecular weight of copolymers |
|---|---|---|---|---|---|
| 20 | Styrene<br>Methyl methacrylate | 90<br>10 | 70 | 59 | 3700 |
| 21 | Styrene<br>α-methylstyrene | 90<br>10 | 70 | 38 | 2000 |
| 22 | Styrene<br>Methyl acrylate | 90<br>10 | 75 | 45 | 2600 |

The embodiment of the invention in which an exclusive property or privilage is claimed are defined as follows:

1. A process for preparing a polymer having a number average molecular weight of less than 5000, which consists essentially of polymerizing styrene monomer and up to less than 50 mole percent of a different vinyl monomer which is copolymerizable with said styrene monomer, in the presence of from 3 to 10 percent by weight, based on the weight of said monomers, of organic peroxide polymerization initiator whose decomposition temperature for 10 hour half-life in 0.1 molar solution in benzene is from 40° to 70° C., at a polymerization temperature which is from 20° to 30° C. higher than said decomposition temperature of said initiator, until said polymer is formed, and then recovering said polymer.

2. A process as claimed in claim 1 in which the polymerizing step is performed by bulk polymerization.

3. A process as claimed in claim 1 in which the polymerizing step is performed by suspension polymerization.

4. A process as claimed in claim 2 or claim 3 in which said initiator consists of an organic peroxydicarbonate.

5. A process as claimed in claim 2 or claim 3 in which said initiator is selected from the group consisting of diisopropyl peroxydicarbonate, di-n-propyl peroxydicarbonate and di(2ethoxy-ethyl)peroxydicarbonate.

6. A process as claimed in claim 2 or claim 3 in which said initiator consists of an organic peroxy ester.

7. A process as claimed in claim 2 or claim 3 in which said initiator is selected from the group consisting of tert-butyl peroxydodecanoate and tert-butylperoxypivalate.

8. A process as claimed in claim 2 or claim 3 in which said initiator consists of an organic peroxydiacyl compound.

9. A process as claimed in claim 2 or claim 3 in which said initiator is selected from the group consisting of di(3,5,5-trimethyl hexanoyl) peroxide, di-lauroyl peroxide, di-propionyl peroxide and di-acetyl peroxide.

10. A process as claimed in claim 1 in which said vinyl monomer is selected from the group consisting of α-methylstyrene, vinyl toluene, bromostyrene, methyl methacrylate, butyl methacrylate, methyl acrylate, dimethyl itaconate, dimethyl maleate, acrylonitrile, vinyl acetate, butadiene and butene.

11. A process as claimed in claim 1 in which the amount of said initiator is from 3 to 8 percent by weight, based on the weight of said monomers.

* * * * *